United States Patent
Sahin et al.

(10) Patent No.: US 10,772,036 B2
(45) Date of Patent: Sep. 8, 2020

(54) PROCEDURES FOR DYNAMICALLY CONFIGURED NETWORK CODING BASED MULTI-SOURCE PACKET TRANSMISSION UTILIZING ICN

(71) Applicant: IDAC Holdings, Inc., Wilmington, DE (US)

(72) Inventors: Onur Sahin, London (GB); Dirk Trossen, London (GB)

(73) Assignee: IDAC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/313,433

(22) PCT Filed: Jul. 6, 2017

(86) PCT No.: PCT/US2017/040891
§ 371 (c)(1),
(2) Date: Dec. 26, 2018

(87) PCT Pub. No.: WO2018/009657
PCT Pub. Date: Jan. 11, 2018

(65) Prior Publication Data
US 2019/0200282 A1 Jun. 27, 2019

Related U.S. Application Data

(60) Provisional application No. 62/359,578, filed on Jul. 7, 2016.

(51) Int. Cl.
*H04W 48/00* (2009.01)
*H04L 29/08* (2006.01)
(Continued)

(52) U.S. Cl.
CPC ........... *H04W 48/17* (2013.01); *H04L 1/0057* (2013.01); *H04L 41/0896* (2013.01);
(Continued)

(58) Field of Classification Search
CPC ........... H04L 2001/0092; H04L 67/327; H04L 67/26; H04L 41/0896; H04L 1/0057; H04W 48/17
See application file for complete search history.

(56) References Cited

U.S. PATENT DOCUMENTS 8,559,434 B2 * 10/2013 Esteve Rothenberg ..................... H04L 45/00
370/392
9,002,921 B2 * 4/2015 Westphal ................ H04L 67/06
709/202
(Continued)

FOREIGN PATENT DOCUMENTS

EP 2611111 7/2013
EP 3062456 8/2016
(Continued)

OTHER PUBLICATIONS

Request for Comments (RFC) 7927; Kutscher et al.; Jul. 2016 (Year: 2016).*
(Continued)

*Primary Examiner* — Benjamin H Elliott, IV
(74) *Attorney, Agent, or Firm* — Invention Mine LLC

(57) ABSTRACT

Systems and methods related to a multi-server pull-based HTTP request-response structure over ICN systems. In one embodiment, a method comprises: publishing an ICN content request from a cNAP with identification $CID_{URI}$; receiving at the cNAP a response from at least one sNAP indicating the availability of the requested content at the at least one sNAP; identifying at the cNAP an optimal segment number, k*, and a set I* of the server IDs, i*, to participate in a network coding based transmission; transmitting the optimal segment number k* from the cNAP to each sNAP identified in the set I*; receiving, at the cNAP, network coding based transmissions from the sNAPs identified in the
(Continued)

set I*, and performing decoding of an overall message at the cNAP.

20 Claims, 6 Drawing Sheets

(51) Int. Cl.
    *H04L 12/26*     (2006.01)
    *H04L 1/00*     (2006.01)
    *H04L 12/24*     (2006.01)

(52) U.S. Cl.
    CPC .......... *H04L 43/0882* (2013.01); *H04L 67/02* (2013.01); *H04L 67/26* (2013.01); *H04L 67/327* (2013.01); *H04L 2001/0092* (2013.01)

(56) References Cited

U.S. PATENT DOCUMENTS

| | | | | |
|---|---|---|---|---|
| 9,425,885 | B2* | 8/2016 | Ben Slimane | H04B 7/15521 |
| 2010/0094950 | A1* | 4/2010 | Zuckerman | H04L 67/1008 709/213 |
| 2010/0235471 | A1* | 9/2010 | Parikh | H04L 41/0893 709/219 |
| 2013/0151584 | A1* | 6/2013 | Westphal | H04L 67/06 709/202 |
| 2014/0020102 | A1* | 1/2014 | Srinivasan | H04L 41/00 726/23 |
| 2016/0057061 | A1* | 2/2016 | Avci | H04L 47/125 370/235 |
| 2016/0173604 | A1* | 6/2016 | Panigrahi | H04L 67/1097 709/216 |
| 2017/0034055 | A1* | 2/2017 | Ravindran | H04W 40/20 |
| 2017/0201375 | A1* | 7/2017 | Amin | H04L 63/08 |
| 2017/0237660 | A1* | 8/2017 | Trossen | H04L 61/15 370/392 |
| 2019/0200282 | A1* | 6/2019 | Sahin | H04L 67/02 |

FOREIGN PATENT DOCUMENTS

| | | |
|---|---|---|
| WO | 2015060297 A1 | 4/2015 |
| WO | 2016033487 | 3/2016 |
| WO | 2016123516 | 8/2016 |
| WO | 2017004508 A1 | 1/2017 |

OTHER PUBLICATIONS

Request for Comments (RFC) 7933; Westphal et al.; Aug. 2016 (Year: 2016).*

"A Survey on Information-Centric Networking: Rationales, Designs and Debates"; Xiaoke et al.; China Communications; Jul. 2015 (Year: 2015).*

Xie, D., et. al., "Network Codes-based Multi-Source Transmission Control Protocol for Content-centric Networks", 2016 IEEE/ACM 24th Int'l Symposium on Quality of Service (IWQOS), IEEE, Jun. 20, 2016 (Jun. 20, 2016), XP032978833, DOI: 10.1109/IWQOS.20161590427, pp. 1-6.

Jonnahtan, S. et. al., "NetCodCCN: A network coding approach for content-centric networks", IEEE INFOCOM 2016—The 35th Annual IEEE Int'l Conference on Computer Communications, IEEE, Apr. 10, 2016 (Apr. 10, 2016), XP032930014, DOI: 10.1109, pp. 1-9.

International Search Report and Written Opinion of the International Searching Authority for PCT/US2017/040891 dated Oct. 19, 2017.

International Preliminary Report on Patentability for PCT/US2017/040891 dated Jan. 8, 2019, 7 pages.

Al-Khalidi, M., et. al., "POINT: IP Over LCN—The Better IP". Deliverable D4.1, Evaluation Plan and Initial Validation Report, Dec. 16, 2015, pp. 1-40.

Hoffman, P., et. al., "The DNS-Based Authentication of Named Entities (DANE) Transport Layer Security (TLS) Protocol: TLSA". Internet Engineering Task Force (IETF), Category: Standards Track, RFC: 6698, available online at: https://tools.ietf.org/html/rfc6698, Aug. 2012, pp. 1-37.

Jacobson, V., et. al., "Networking Named Content". CoNEXT Proceedings of the 5th International Conference on Emerging Networking Experiments and Technologies, ACM, Dec. 1-4, 2009, pp. 1-12.

Jarmoc, J. "Transitive Trust: SSL/TLS Interception Proxies". Secure Works, available at https://www.secureworks.com/research/transitive-trust, Mar. 21, 2012, 25 pages.

Jokela, P., et. al., "LIPSIN: Line Speed Publish/Subscribe Inter-Networking". ACM SIGCOMM Computer communication Review, vol. 39, No. 4, Aug. 17-21, 2009, pp. 195-206.

Liang et al, "When HTTPS Meets CDN: A Case of Authentication in Delegated Service". IEEE Symposium on Security and Privacy, (2014), pp. 67-82.

Trossen, D., et. al., "Designing and Realizing an Information-Centric Internet". IEEE Communications Magazine, vol. 50, No. 7, Jul. 2012, pp. 60-67.

Trossen, et. al., "Final Updated Architecture". PURSUIT Publish Subscribe Internet Technology FP7-INFSO-ICT-257217, Deliverable D2.5, Mar. 5, 2013.

Xylomenos et. al., "A Survey of Information-Centric Networking Research". IEEE Communications Surveys and Tutorials, vol. 16, No. 2, (2013), pp. 1-26.

Xylomenos et. al., "Socket Emulation Over a Publish/Subscribe Network Architecture". Proceedings of the Future Network and Mobile Summit, (2010), pp. 1-5.

International Preliminary Report on Patentability for PCT/US2016/015713 completed on Feb. 22, 2017, 16 pages.

International Search Report and Written Opinion of the International Searching Authority for PCT/US2016/015713 dated Apr. 24, 2016, 13 pages.

Kzenevic, M., et.al., "On the Practical Performance of Rateless Codes". In WINSYS, (2008), 4 pages.

Liu, Y., et. al., "Network Coding-Based Multisource Content Delivery in Content Centric Networking". Journal of Network and Computer Applications, vol. 64, (2016), pp. 167-175.

Montpetit, M., et. al., "Network Coding Meets Information-Centric Networking: an Architectural Case for Information Dispersion Through Native Network Coding". Proceedings of the 1st ACM workshop on Emerging Name-Oriented Mobile Networking Design-Architecture, Algorithms, and Applications, ACM, Jun. 2012, 6 pages.

Parisis, G., et. al., "Efficient Content Delivery through Fountain Coding in Opportunistic Information-Centric Networks". Preprint submitted to Elsevier, Nov. 29, 2016, pp. 1-29.

Liu, W., et., al., "Multisource Dissemination in Content-Centric Networking". Fourth International Conference on the Network of the Future (NoF), (2013), pp. 1-5.

\* cited by examiner

PROCEDURES FOR DYNAMICALLY CONFIGURED NETWORK CODING BASED MULTI-SOURCE PACKET TRANSMISSION UTILIZING ICN

CROSS-REFERENCE TO RELATED APPLICATIONS

The present application is a national stage application under 35 U.S.C. 371 of International Application No. PCT/US2017/040891, entitled PROCEDURES FOR DYNAMICALLY CONFIGURED NETWORK CODING BASED MULTI-SOURCE PACKET TRANSMISSION UTILIZING ICN, filed on Jul. 6, 2017, which claims benefit under 35 U.S.C. § 119(e) from U.S. Provisional Patent Application Ser. No. 62/359,578, filed Jul. 7, 2016, entitled "PROCEDURES FOR DYNAMICALLY CONFIGURED NETWORK CODING BASED MULTI-SOURCE PACKET TRANSMISSION UTILIZING ICN," which is incorporated herein by reference in its entirety.

BACKGROUND

Information-centric networks (ICNs) constitute a new networking paradigm in which content is exchanged by means of information addressing. Different architectures may be used to realize ICNs, which may require the partial replacement of current network infrastructure and equipment, such as, for example, routers, gateways and the like, in order to realize the desired network-level functions of these solutions. ICNs may provide improvements to current networking, including, for example, better performance, multicast support, in-network caching, and the like.

Migration scenarios from current network architectures to ICNs foresee that the new architectures may be realized as an overlay over existing architectures, such as for example, Internet Protocol (IP) based or local Ethernet based architectures. Such migration, however, may still require the transition of the user equipment (UE) to an ICN-based solution. With IP-based applications currently providing a broad range of Internet services, transitioning all of these applications may easily be seen as a much harder task than the pure transition of the network-level functionality. Protocol stack implementation in the UE, for example, will require additional functionality in the ICN context. Server-side components, for example, e-shopping web-servers, content servers, and the like, will additionally require new functionality in the ICN context. Further, changes to UEs due to different network protocol stacks may be difficult to implement because upgrades to device operating systems (OS) may be needed. In addition, ICNs may require changes to applications which utilize IP-level abstraction, such as for example sockets to program distributed functionality. In addition to the difficulty of modifications applications, modifications to integrated development environments (IDEs), software development kits (SDKs) and the like may also be required and difficult. Accordingly, one may assume that IP-based services, and with it purely IP-based UEs, will continue to exist for some time to come.

The retrieval from content from a number of IP-based endpoints has been a long-standing problem with a number of solutions, particularly in the peer-to-peer (P2P) networking space. For instance, BitTorrent content is usually pulled from a number of torrent computers, based on the availability of content being managed by so-called torrent sites that provide a sort of directory service for well-known torrent-based content, such as popular video.

In traditional HTTP-based communication, however, the communication between client and server is based on a unicast semantic, i.e., the client sends a request to a particularly server as resolved through the Domain Name Service (DNS), while the server sends the response code (including any resource such as a video or image file) back to the originating client. Reliability of requests and responses are provided by the underlying transport protocol functionality, such as provided by TCP over traditional IP-based networks. On top of such HTTP-based unicast semantic, any application layer protocol could be implemented that utilized the availability of content at different sites in order to retrieve such content, similar to the aforementioned torrent sites (which normally operate directly on top of TCP rather than HTTP).

In addition, network coding is used as a technique to increase efficiency by utilizing information-centric foundations for the encoding of the content so that content can be reconstructed by utilizing the redundancy added through network coding. Hence, by receiving network coded content, the original content can be reconstructed by reversing the computations of the network coding at the receiver side. Such technique can be utilized in many ways. One typical way is that of distributing content to a large number of users, for instance for software updates of operating systems, from a single sender site. Here, so-called fountain coding variants can be used to allow clients to 'tune into' the transmissions and restore the original content once they will have received enough information for the restoration of the original file (such as the file for a software update). The solution here is akin to a glass being moved close to a fountain of water, ultimately filling the water by simply staying for long enough close to the fountain—an analogy that motivates the name for this coding technique.

Network coding can also be used for so-called multi-source transmission, similar to the aforementioned Bittorrent content exchange. Hence, content is encoded by all senders according to well-known coding parameters and sent to all clients who may want to receive said content. Client may choose to receive the content from all or only a sub-set of sources, being able to restore the content by simply staying for 'long enough' to have received enough information to restore the original content.

SUMMARY

Described herein are systems and methods related to dynamically configured network coding based multi-source packet transmission utilizing ICN. Various embodiments provide a multi-server pull-based HTTP request-response approach over ICN systems.

Algorithms and procedures for a network coding based multi-source packet transmission with the packets at the host servers being partitioned into multiple segments with the segment number identified by the requestor node and conveyed to the host servers based on the system and content related information obtained from the network, e.g., host servers Algorithms and procedures for such a method with the number and id of the servers participating in the network coding based transmission being determined by the requestor node and conveyed to the selected host servers along with the updated segment number An embodiment for such algorithms and procedures for a multi-server HTTP over ICN scenario in which content resides on several surrogate HTTP servers and are pulled from a subset of said servers as an outcome of an optimization criteria.

ICN based protocols and signaling procedures for the initiation, delivery and termination of requested packets from the multiple sources to the corresponding destination under various metrics including latency.

In one embodiment, disclosed is a method comprising: publishing an ICN content request from a cNAP with identification $CID_{URI}$; receiving at the cNAP a response from at least one sNAP indicating the availability of the requested content at the at least one sNAP; identifying at the cNAP an optimal segment number, k*, and the set I* of server IDs, i*, to participate in a network coding based transmission; transmitting the optimal segment number k* from the cNAP to each sNAP identified in the set I* of optimal server IDs i*; receiving, at the cNAP, network coding based transmissions from the sNAPs identified in I*; and performing decoding of an overall message at the cNAP.

In one embodiment, disclosed is a method comprising: receiving, at a sNAP, a content request from a cNAP; communicating to an HTTP server communicatively coupled to the sNAP an HTTP request to probe the availability of the requested content; receiving a 200 Ok message at the sNAP from the HTTP server; publishing a response from the sNAP, wherein the response carries a data payload with the information of $P_s$ and $C_i$ with $C_i$ being the capacity between the responding sNAP and the cNAP; receiving a requested segment number k* from the cNAP; and initiating a network coding based transmission from the sNAP based at least in part upon the k* information.

In some embodiments, a method is performed by a cNAP on an information-centric network. In an exemplary method, a request for content is received from a client (for example in an HTTP request). The cNAP publishes to the ICN a probe request that identifies the content. In response to the probe request, the cNAP receives a response from each of a plurality of responding sNAPs at which the content is available, where each response identifies at least a link capacity ($C_i$) of the respective responding sNAP. Based at least in part on the respective link capacities, the cNAP selects a number (k*) of segments for network coding of the content, and the cNAP publishes to the ICN a request to receive the content as network-coded transmissions from at least a subset of the responding sNAPs using the segment number k*. In some embodiments, at least one of the responses identifies an original aggregated packet size ($P_S$) of the content, and the number k* of segments is determined based at least in part on the aggregated packet size of the content. The cNAP receives the content as network-coded transmissions over the ICN, decodes the transmissions to reconstruct the content, and provides the reconstructed content to the client, for example in an HTTP response.

In some embodiments, the responses further identify an original aggregated packet size ($P_S$) of the content, and the number k* of segments is determined based at least in part on the aggregated packet size of the content.

In some embodiments, the number k* of segments is selected so as to satisfy a predetermined latency constraint.

In some embodiments, the cNAP selects, from among the responding sNAPs, a selected subset of sNAPs from which to receive the content, wherein the segment number k* is determined based at least in part on the selected subset. The subset of sNAPs is selected so as to satisfy a predetermined latency constraint. The cNAP may publish to the ICN information identifying the selected subset of sNAPs.

In some embodiments, a cNAP apparatus is provided. The cNAP apparatus may include a processor and a computer-readable storage medium storing instructions operative to perform the functions described herein.

BRIEF DESCRIPTION OF THE DRAWINGS

A more detailed understanding may be had from the following description, presented by way of example in conjunction with the accompanying drawings, wherein.

DETAILED DESCRIPTION

A detailed description of illustrative embodiments will now be provided with reference to the various Figures. Although this description provides detailed examples of possible implementations, it should be noted that the provided details are intended to be by way of example and in no way limit the scope of the application.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Exemplary Network Hardware.

Figure 1A:
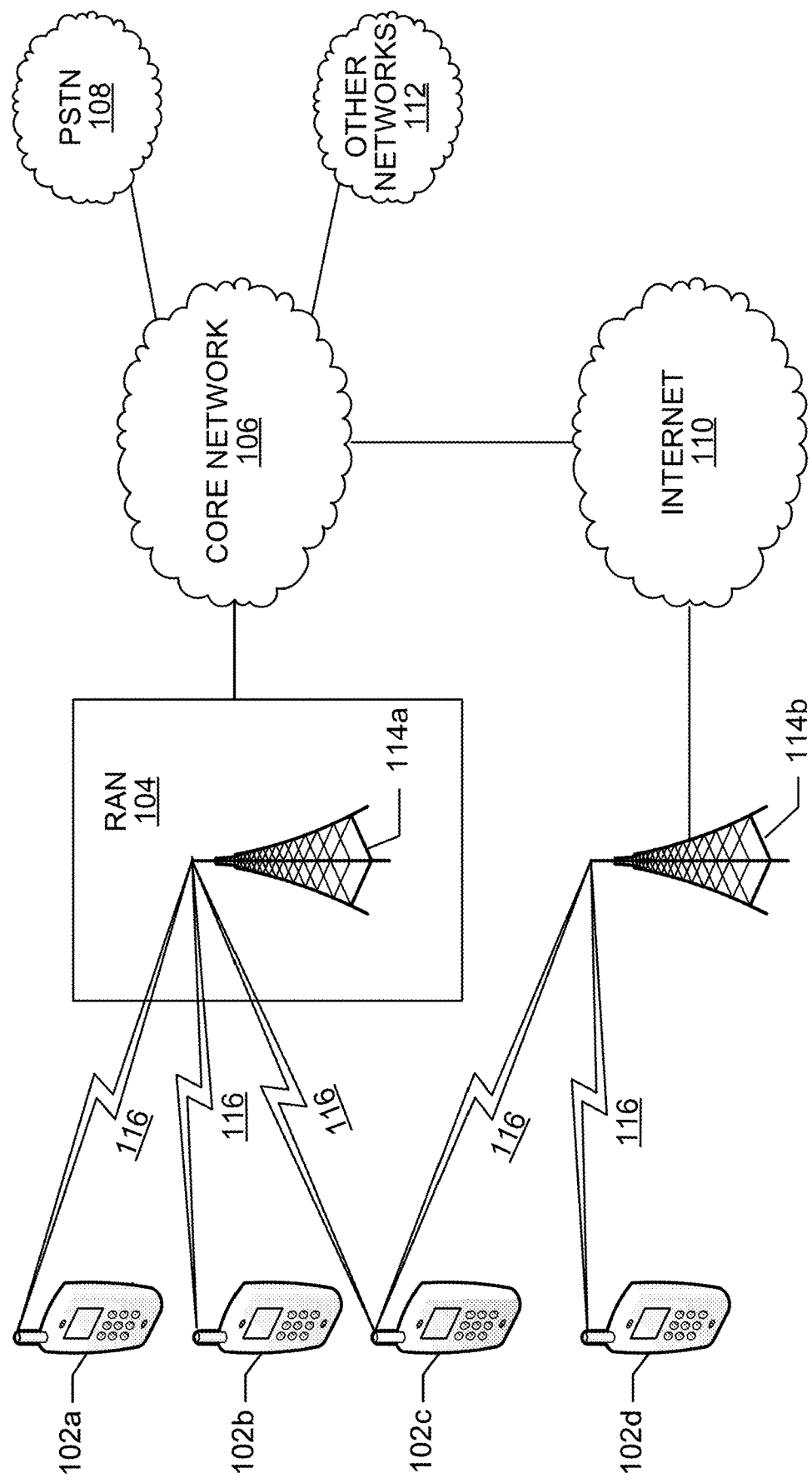
FIG. 1A depicts an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d m the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
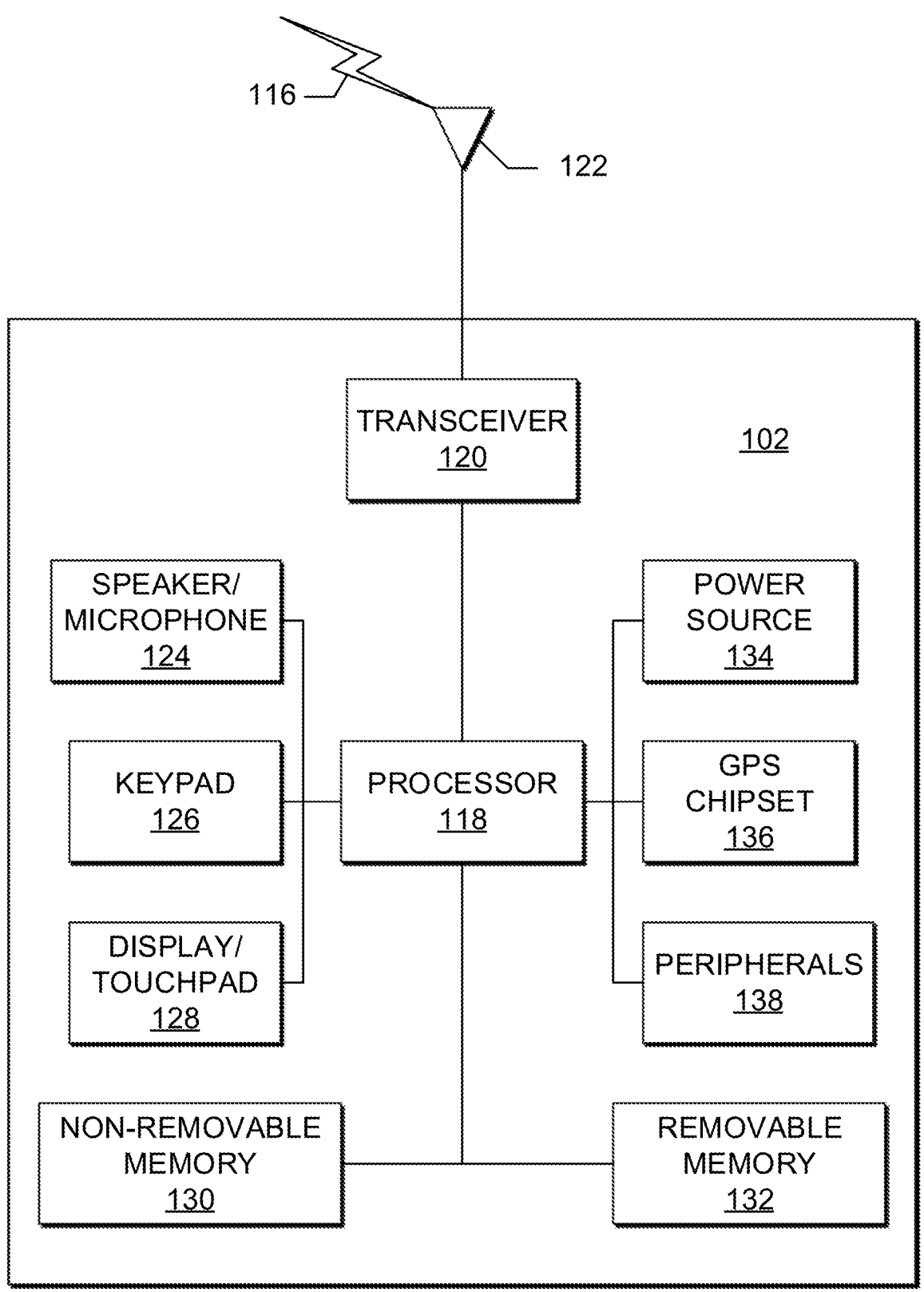
FIG. 1B depicts an example wireless transmit/receive unit (WTRU) that may be used within the communications system of FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or 1•eceive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two 01• more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
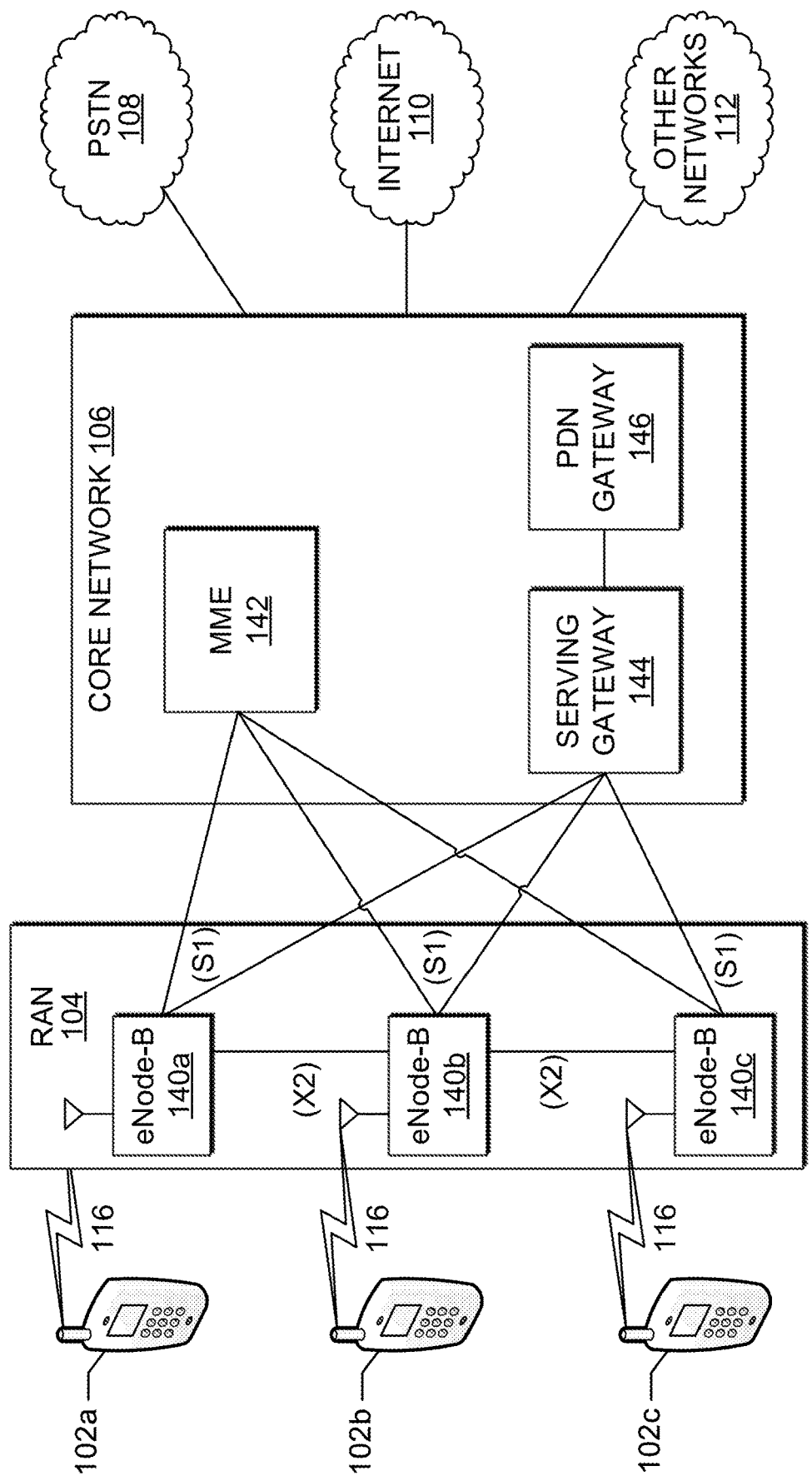
FIG. 1C depicts an example radio access network (RAN) and an example core network that may be used within the communications system of FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode-Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode-B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Exemplary HTTP Over ICN Framework.

Disclosed herein are systems and methods for HTTP-based content transmission that are opaque to the possible retrieval of the content from multiple sources. Exemplary embodiments may be implemented in a system of HTTP-based servers where clients send standard HTTP requests to the fully qualified domain name (FQDN) of the web resources, while receiving the response from a subset or all possible servers that serve said FQDN. With that, such a system or method would be similar to Bittorrent retrieval but would not require proprietary torrent-like protocols, instead relying on standard HTTP request-response semantics, while delivering the content in said multi-source fashion whenever it is possible while simply using a standard unicast delivery for cases of only having a single server.

One network architecture that may be used for exemplary embodiments is described in International Application Publication No. WO2016123516A1, filed on Jan. 29, 2016, entitled "Methods and Systems for Anchoring Hypertext Transfer Protocol (HTTP) Level Services in an Information Centric Network (ICN)," hereby incorporated by reference in its entirety. In such a system, HTTP communication is realized by translation into an exchange of information-centric networking messages, based on a publish/subscribe semantic. HTTP requests are published towards the FQDN of the server serving the request, interpreting said FQDN as a named object, while HTTP responses are published towards the full URL of the request, likewise interpreting the full URL as a named object. Such embodiments may be realized in specific network attachment points (NAPs) and border gateways (BGWs) towards user equipment and peering IP networks.

In this disclosure, such systems are utilized to enable the transmission of HTTP requests to a plurality of HTTP-based servers serving the FQDN, while responses from these selected servers are transmitted back to the client utilizing network coding for reliability purposes. Apart from increased reliability, such an approach may also yield higher network utilization and latency benefits due to spreading the network load across a number of servers. Embodiments described in the present disclosure provide a multi-server pull-based HTTP request-response solution over ICN systems.

System Architecture.

Figure 2:
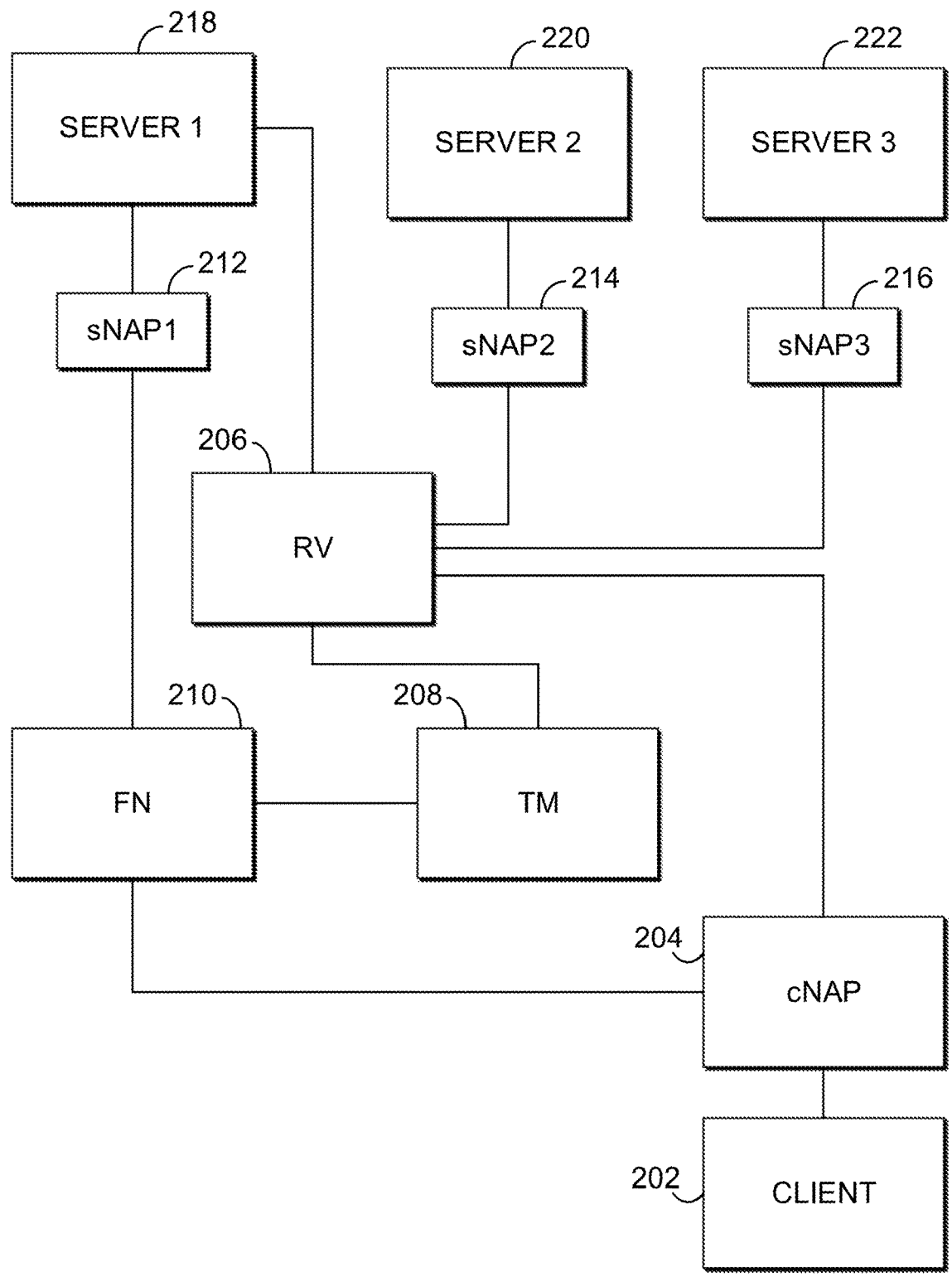
FIG. 2 illustrates one embodiment of a multi-source single destination system architecture and interfaces.

FIG. 2 illustrates an exemplary system architecture and interfaces of one embodiment of the herein disclosed system, using components described in greater detail in WO2016123516A1. As shown, a client 202 interfaces with the ICN through client network attachment point (cNAP) 204, which may be one of many cNAPs. The cNAP 204 interfaces with the ICN elements of the network, such as RV 206 (e.g., name resolution function, mapping a subscriber to a publisher), TM 208 (e.g., topology management function, collecting topology of its domain and exchanging routing information with other domains for global routing), and FN 210 (e.g., forwarding function, directing information items to a client). Similarly, the content providers, sNAPs 212, 214, 216 and their respective associated servers 218, 220, 222 attach to the network via standard ICN interfaces. Disclosed herein are embodiments in which multiple sNAPs and their servers operating in the network will deliver responses to clients, participating in a joint network-coding-based content delivery method as disclosed herein.

Namespace for Multi-Source Coding.

Figure 3:
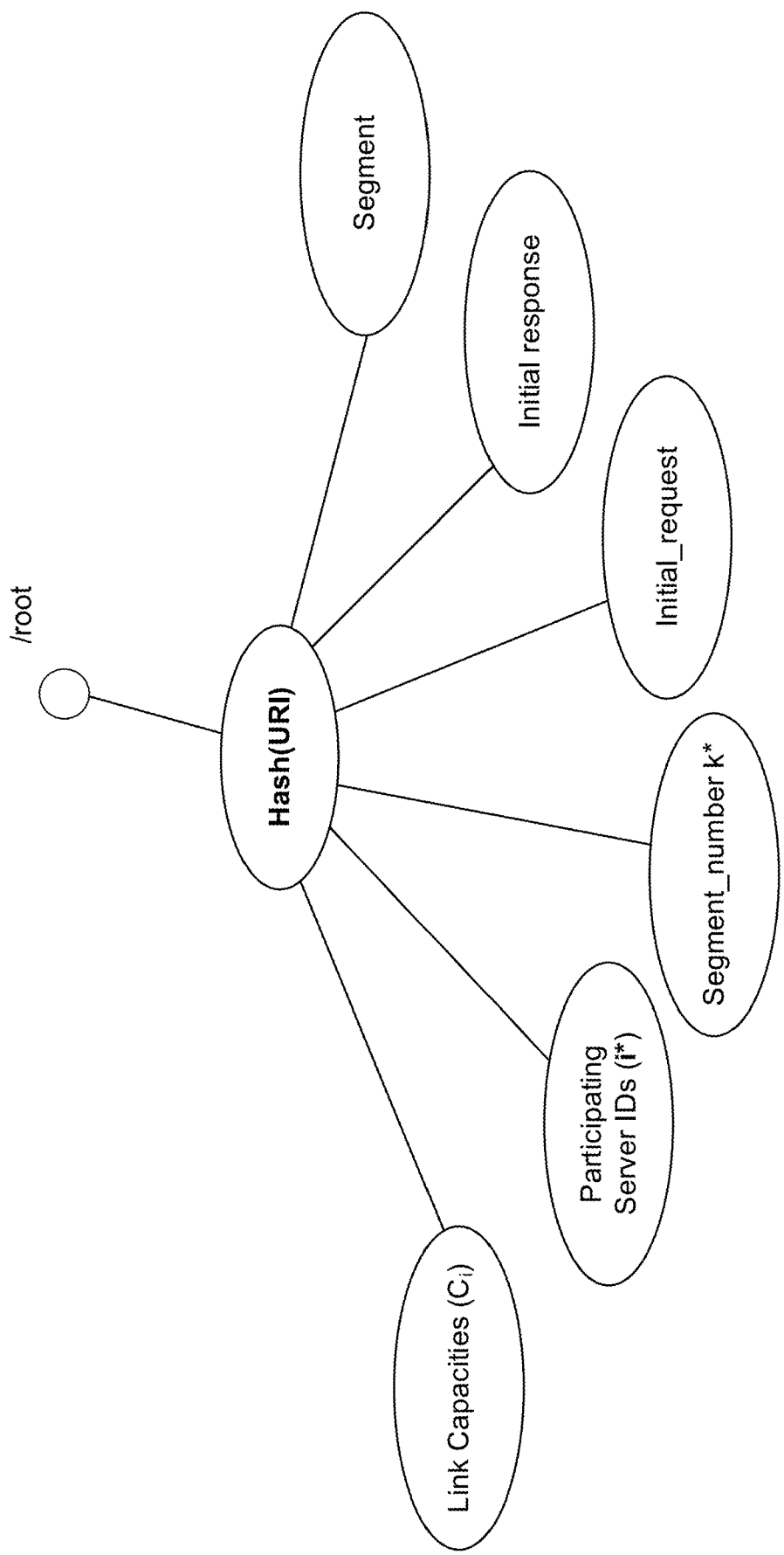
FIG. 3 depicts one embodiment of a namespace that defines the structure of the information being exchanged in the disclosed systems and methods.

FIG. 3 shows one embodiment of a namespace that defines the structure of the information being exchanged in the disclosed systems and methods. The/root scope hosts all information items exchanged, identified through the hash over the URI of the request. In turn, the hash(URI) item functions as a scope with several underlying scopes utilized in the information exchange between the sNAPs and the cNAP which perform the network coding based transmission.

In one embodiment, the identifier space is partitioned such that each child scope can be assigned with a particular identifier, e.g., in the form of 0x0000y000. For instance, the Link Capacities scope can be assigned with 0x00002000 while Participating Server IDs scope assigned with 0x00001000, etc. The exact nature and assignment of these scopes may likely be subject to standardization, together with the assignment of the/root scope.

Although the embodiment of the namespace in FIG. 3 suggests a separate namespace for the multi-source HTTP exchange, based entirely on the publication of the request under the URI of the request, in another embodiment, there is an integration of the namespace with the namespace described in WO2016123516A1, implementing the herein disclosed retrieval method selectively for certain URIs only. In that case, the messaging (shown in FIG. 4) may initiate the retrieval via a publication towards the FQDN only, not the full URI, while the decision for which URI to use the multi-source retrieval solution would be implemented in the RV function of FIG. 2.

For providing a clarity of presentation, however, the present disclosure focuses the description on an embodiment that realizes the solution in a separate namespace. In view of the present disclosure, it will be apparent to one of ordinary skill in the art how to implement comparable embodiments without a separate namespace.

Methods for Network-Coding-Based Packet Transport.

In this section, set forth are embodiments in which system parameters interact in relation to the requested information (e.g., number of packets), network elements (e.g., number of servers to be included in the network coding and transmission) for different metrics such as latency and network capacity utilization.

System Parameters:

In the following, exemplary system parameters that are configured dynamically in the given multi-source single destination packet transmission framework are described.

k: Number of source/input packets

N: Number of encoded packets that are sufficient to decode k source/input packets $\rho_k$: Fountain encoding overhead, ~(N−k)/k ($\rho_k$ is a monotonically decreasing function of k)

L: Source packet acquisition latency at the destination node, e.g., time consumed starting from the source packet encoding at the source node(s) until the end of decoding of the packet at the destination node $L_{ed}$: Encoding/Decoding latency ($f_{ed}$ is a monotonically increasing function of k)

$L_{tx}$: Transmission latency $L_{th}$: Service level latency constraint $p_k$: Source/input packet size per encoded segment (bytes)

$\rho_{pkt}$: Packetization overhead (including fountain code encoding description, packet header, packet FEC, etc.; this might be extended to include overhead due to retransmission)

$P_S$: Original aggregate packet size (bytes)

$P_{Neff}$: Encoded aggregate packet size including the overheads (bytes)

$C_i$: Link capacity from Source/Server i to destination $C_{eff}$: Aggregate effective network capacity utilized in transmitting N packets from the sources to the destination S: Total number of sNAPs that host the content $S_N$: Number of sNAPs that participate in network coding based content delivery ($S_N \leq S$)

where $$N = k \times (1 + \rho k)$$

$$L = L_{ed} + L_{tx}$$

-continued $$L_{ed} = f_{ed}(k), L_{tx} \cong P_{Neff}/C_{eff}$$

$$P_S = k \times p_k$$

$$P_{Neff} = N \times p_k \times (1 + \rho_{pkt}) \text{ bytes}$$

$$C_{eff} \cong \sum_{i=1}^{S_N} C_i$$

Note that a larger packet leads to a lower fountain code encoding description (as a lesser number of packets are used in encoding) and lower effective packet overhead (compared with smaller packets, each having a unique packet header).

Metrics:

Particular metrics that make use of the above parameters include, but are not limited to:

Latency (L):

Latency may be influenced by two factors; (i) encoding/decoding latency, and (ii) packet transmission latency; $L = L_{ed} + L_{tx}$.

(i)—Encoding/Decoding latency increases with the number of packets, k, due to the process of choosing randomly d packets out of k and encoding (XOR) into N packets.

(ii)—Transmission latency may be represented as the size of packets to be transmitted divided by the capacity.

Network Utilization ($\tau_C$):

Throughput of successfully received source packets/Aggregate Network Capacity, $$\tau_C = \left[\left(k \times \frac{p_k}{L_{tx}}\right) \Big/ C_{eff}\right] = k/[N \times (1 + \rho_{pkt})]$$

$$\left(\text{or } \tau_C = \left[\left(k \times \frac{p_k}{L_{ed} + L_{tx}}\right) \Big/ C_{eff}\right]\right)$$

if the codec latency is also included). Due to fountain code construction; k/N increases with k. Hence, network capacity utilization is arguably maximized with a larger k.

Table 1 illustrates LT encoding overhead and latency in a table adapted from Kzenevic et al., On the Practical Performance of Rateless Codes, 2006.

TABLE 1

| Message Size [k] | Overhead [%] | Latency [s] | LOP [ms] |
|---|---|---|---|
| 667 | 49.55 | 1.53 | 375.65 |
| 833 | 42.1 | 1.5 | 256.86 |
| 1333 | 30.37 | 0.99 | 91.31 |
| 2000 | 22.85 | 0.91 | 47.51 |
| 4000 | 10.61 | 1.17 | 13.17 |
| 10000 | 6.23 | 2.11 | 8.19 |
| 12000 | 5.88 | 2.47 | 8.54 |
| 20000 | 5.32 | 5.63 | 15.95 |
| 40000 | 4.79 | 14.55 | 33.38 |

Metric Based Source Segment/Block (k) and Server ($S_N$) Selection:

Latency Constrained Optimization:

For the condition of latency minimization of a source packet transmission, e.g., $$\min_{k, S_N} L \text{ s.t. } 1 \leq k \leq p_k, S_N \leq S$$

an optimal strategy may be to select the upper bound on the number of servers actively sending the packet, e.g., $S_N = S$, whereas the number of packets, k*, which is a solution of the following:

$$\text{argmin } k := L_{ed} + L_{tx} = f_{ed}(k) + [N \times p_k \times (1 + \rho_{pkt})] / \Sigma_{i=1}^{S} C_i \quad \text{Equation 1}$$

For the condition of a latency constrained transmission, e.g., $$\text{Find } \{k^*, S_N^*, i^*\} \text{ s.t. } L \leq L_{th}, 1 \leq k \leq p_k, S_N \leq S, i \in I\{i: 1 \leq i \leq S\},$$

the optimal parameters may be selected as the solution of the following:

$$\operatorname{argmin}_{k, S_N, i} := L_{ed} + L_{tx} = f_{ed}(k) + [N \times p_k \times (1 + p_{pkt})] / \Sigma_{i=1}^{S_N} C_i \leq L_{th}, \quad \text{Equation 2}$$

and $1 \leq k \leq p_k$, $S_N \leq S$, $i \in I\{i:1 \leq i \leq S\}$.

For clarity, k* is used to represent an optimal number of segments.

For clarity, i is the ID of a given sNAP, where I is the set of all sNAP IDs including [1, . . . , S]. i* is understood as the ID of a particular optimal sNAP in an optimal set I* of optimal sNAP IDs.

For clarity, $S_N^*$ is used to represent an optimal number of sNAPs participating in a particular optimal solution.

In some embodiments optimization is performed by selecting $S_N^*=S$, that is to include all the servers in the packet transmission where the problem is reduced into the latency minimization problem discussed above. Yet, depending on the latency threshold, $L_{th}$, the optimization space may also yield the tuples $(k^*, S_N^*, I^*)$, that are within the solution set of the optimization problem above. Here, the set I* identifies the server IDs that are requested to join the packet transmission.

Exemplary Solution Steps:

In an exemplary procedure, optimal segment number k* and the set I* of the server IDs, i*, to participate in the network coding based transmission are identified by the cNAP. These parameters are then conveyed to the corresponding network elements, e.g., host sNAPs that are in the set I* of i*s. One embodiment of a message sequence flow of the operation is detailed below and shown in FIG. 4.

Figure 4:
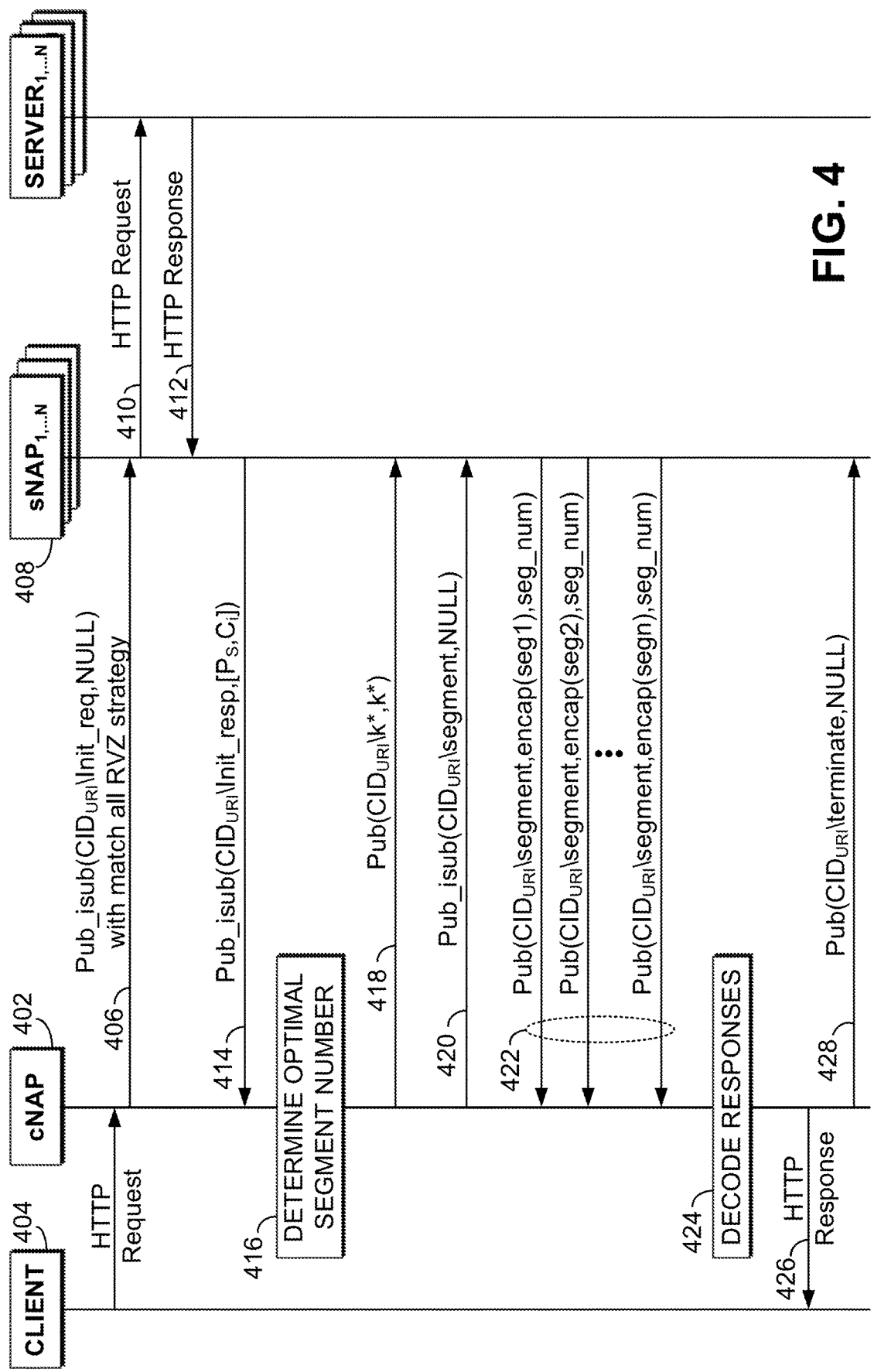
FIG. 4 depicts a message sequence chart for one embodiment of network coding based packet request and transmission

As shown in FIG. 4, a cNAP 402 receives an HTTP request from an associated client 404, where the HTTP request provides a uniform resource identifier (URI) of content to be retrieved. In response to the HTTP request, the cNAP in step 406 initially publishes to the corresponding information scope (e.g., Hash(URI)\initial_request in FIG. 3) regarding its content request with content identification $CID_{URI}$. This is carried out by an implicit subscription signal (Pub_isub messaging) such that the cNAP automatically subscribes to the *\initial_request scope shown in FIG. 3. In one embodiment, this message may contain a NULL data payload. The sNAPs 408 that are subscribed to the scope initially communicate with their respective servers via respective HTTP requests 410 to probe the availability of this content. Depending on the availability, the servers send respective HTTP response messages 412 back to their attached sNAPs. For example, the servers that host the requested content may respond to their respective attachment point with a "200 OK" HTTP message. In step 414, each of the sNAPs that received a "200 OK" message from its corresponding server send a pub message to the cNAP, which is published under the information scope *\initial_response shown in FIG. 3. This pub message may also be an implicit sub message type which allows the servers that host the content to participate in the transmission in a later step of the procedure. Also, the corresponding pub_isub message for the *\initial_response scope carries the data payload with the information of $P_S$ and $C_i$, with $C_i$ being the capacity between the responding sNAP and the cNAP.

Based on the messages received in step 414, the cNAP performs a table population step. The cNAP, with the reception of various pub_isub messages from the sNAP, assigns temporary IDs to these sNAPs which participate in the network coding based transmission of the content. Table 2 below shows an example populated table with S responding sNAPs. Upon the reception of the pub_isub message corresponding to the *\initial_response scope, the cNAP assigns a temporary ID to the message that carries the $P_S$ and $C_i$ information, which directly translates into temporary ID assignment to the sNAP sending this pub_isub message. Hence, with the reception of all corresponding messages from the participating sNAPs, the Table 2 is populated, which is later used to send corresponding feedback messages to the sNAPs of interest.

TABLE 2

Temporary ID assignment at cNAP to the servers that are available to participate in the network coding based content delivery.

| Server ID | $P_s$ | $C_i$ | $N_{Idi}$ |
|---|---|---|---|
| 1 | Ps, 1 | $C_1$ | $Temp_{ID1}$ |
| 2 | Ps, 2 | $C_2$ | $Temp_{ID2}$ |
| 3 | Ps, 3 | $C_3$ | $Temp_{ID3}$ |
| . . . | Ps, . . . | C . . . | $Temp_{ID}$ . . . |
| S | Ps, S | $C_S$ | $Temp_{IDS}$ |

The cNAP sets the latency constraint of the packet to be received ($L \leq L_{th}$) depending on its local service level latency requirements. In some embodiments, such information is not necessarily conveyed to the host sNAPs as the optimal segment number, k*, is determined by the cNAP itself.

As shown in Equation 1 and Equation 2 above, the optimal segment number additionally depends on the original aggregate packet size, $P_S$ and link capacity, $C_i$, which are populated in Table 2 as responses are received at the cNAP from the sNAPs.

In some systems and methods disclosed herein, the cNAP determines an optimal segment size, k*, communicates with at least some of the hosting sNAPs, and receives responses therefrom. In some embodiments, all hosting sNAPs are utilized. In some embodiments, a subset of all hosting sNAPs is utilized.

Embodiments Using all Hosting sNAPs.

In some embodiments, all host server (e.g. sNAPs) that are known to host the requested content participate in the transmission of the content to the destination node (cNAP). One embodiment of the procedures is performed as follows.

Since all host sNAPs participate in network coding and transmission of encoded packets in this option, as shown in Equation 1, the cNAP obtains the aggregate link capacity between the cNAP and all host sNAPs, e.g., $\Sigma_{i=1}^{S} C_i$. This information may be directly obtained from a populated table (e.g. Table 2), or similarly based upon the responses from the sNAPs. In an alternative embodiment, a network monitoring system is used to derive such link capacity information, e.g., through SDN-based monitoring. This information may be conveyed to the cNAP via standard ICN packet transmission procedures.

With the $S_N$, $\Sigma_{i=1}^{S} C_i$, $P_S$ and $L_{th}$ parameters obtained as described, the cNAP in step 416 determines an optimal segment number, k*, by solving $k^*=\operatorname{argmin} k := L_{ed} + L_{tx} = f_{ed}(k) + [N \times p_k \times (1 + \rho_{pkt})] / \Sigma_{i=1}^{S} C_i$ as in Equation 1.

The requested segment number, k*, is conveyed to all sNAPs that host the content via the pub message pub ($CID_{URI} \backslash k^*, k^*$) in step 418 of FIG. 4 where the sNAPs already subscribe to the corresponding scope *\segment_number shown in FIG. 3.

Embodiments Using Selected Hosting sNAPs.

In some embodiments, only a subset of host servers (e.g., sNAPs) participate in the network coding and transmission of the encoded packets to the cNAP. The set of participating server IDs, I*, and segment size, k*, is determined by the cNAP, and these pieces of information are published to the corresponding sNAPs by the cNAP.

With the $S_N$, $C_i$, $P_S$ and $L_{th}$ parameters obtained as described, e.g., via the population of Table 1, the cNAP in step 416 determines the optimal segment number, k* and I*, for example by solving argmin k, $S_N$, i:=$L_{ed}$+$L_{tx}$(=$f_{ed}$(k)+ [N×$p_k$×(1+$p_{pkt}$)]/$\Sigma_{i=1}^{S_N}C_i \leq L_{th}$ as in Equation 2.

The host servers that are selected for the encoding and transmission campaign, that is the ones with IDs in the set I*, are informed by the cNAP subscribing to the corresponding scope, Participating Server IDs, as shown in FIG. 3 and also in the message sequence chart of FIG. 4. This is achieved by the cNAP transmitting the pub($CID_{URI}$\k*,k*) message (step 418) only to the sNAPs which are identified by Equation 2. Moreover, the cNAP identifies which sNAP to send the k* information via using the temporary ID assignment already carried out in Table 2. That is the $C_i$ and $P_S$ information which are mapped to the temporary id $Temp_{IDi}$ is utilized in Equation 2, where the sNAP set I* to participate in the network coding based content transmission is identified by $Temp_{IDi}$s.

Network-Coding-Based Content Transmission from the sNAPs to cNAP.

In step 420, with the requested segment number available at the sNAPs, the cNAP sends a pub message under the information scope *\segment (FIG. 3) utilizing an implicit sub message pub_isub($CID_{URI}$\segment, NULL). This pub allows the cNAP to also subscribe under the *\segment information scope, hence enabling the reception of the content segments transmitted by the sNAPs.

Subsequently, in step 422, the sNAPs, utilizing their subscription under the *\segment scope, along with the availability of k* information obtained previously as described above, initiate network coding based transmission. This may be carried out any one of various known network coding techniques, e.g., Luby transform coding, where the sNAPs perform network coding on the selected segments (where the segments to participate in network coding are determined according to segment number k*). Then, by using random or semi-random number generator, the sNAP identifies which segments to send simultaneously, e.g., via an XOR operation. The segment ids XORed and transmitted by the sNAP are also conveyed via the pub message under seg_num payload.

With the collection of multiple network coded content segments, the cNAP 402 performs decoding of the overall message in step 424 as in standard network coding information detection mechanisms. Once the information is decoded by the cNAP, it provides the information to the client 404 in an HTTP response 426 and informs the participating sNAPs by publishing under the *\terminate scope in step 428, indicating that the sNAPs can cease transmission of the network-coded content.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

We claim:

1. A method performed by a client network attachment point (cNAP) to an information-centric network (ICN), the method comprising:
   receiving a request for content from a client;
   publishing to the ICN a probe request identifying the content;
   in response to the probe request, receiving responses from respective responding server network attachment points (sNAPs) at which the content is available, each response identifying a link capacity of the respective responding sNAP;
   based at least in part on the respective link capacities, selecting a number of segments for network coding of the content; and
   publishing to the ICN a request to receive the content as network-coded transmissions from at least a subset of the responding sNAPs using the number of segments.

2. The method of claim 1, wherein at least one of the responses further identifies an original aggregated packet size of the content, and wherein the number of segments is determined based at least in part on the aggregated packet size of the content.

3. The method of claim 1, wherein the number of segments is selected so as to satisfy a predetermined latency constraint.

4. The method of claim 1, further comprising selecting, from among the responding sNAPs, a selected subset of sNAPs from which to receive the content, wherein the number of segments is determined based at least in part on the selected sub set.

5. The method of claim 4, further comprising publishing to the ICN information identifying the selected subset of sNAPs.

6. The method of claim 4, wherein the subset of sNAPs is selected so as to satisfy a predetermined latency constraint.

7. The method of claim 1, wherein the request for content is an HTTP request.

8. The method of claim 1, further comprising:
   receiving the content as network-coded transmissions over the ICN;
   decoding the network-coded transmissions to reconstruct the content; and
   providing the reconstructed content to the client.

9. The method of claim 8, wherein the reconstructed content is provided to the client in an HTTP response.

10. The method of claim 8, further comprising, after reconstructing the content, publishing on the ICN a message indicating that the sNAPs can cease transmission of the content.

11. The method of claim 1, further comprising, at an sNAP:
   receiving over the ICN the probe request identifying the content;
   retrieving the content from a server associated with the sNAP;
   publishing on the ICN a response to the probe request, the response identifying an aggregated packet size of the content and a link capacity of the sNAP;

receiving over the ICN information indicating the selected number of segments;

encoding the content using network coding with the selected number of segments; and publishing at least a portion of the encoded content to the ICN.

12. A client network attachment point (cNAP) for an information-centric network (ICN), the cNAP comprising a processor and a non-transitory computer-readable storage medium storing instructions operative to perform a method comprising:

receiving a request for content from a client;

publishing to the ICN a probe request identifying the content;

in response to the probe request, receiving responses from respective responding server network attachment points (sNAPs) at which the content is available, each response identifying a link capacity of the respective responding sNAP;

based at least in part on the respective link capacities, selecting a number of segments for network coding of the content; and publishing to the ICN a request to receive the content as network-coded transmissions from at least a subset of the responding sNAPs using the number of segments.

13. The cNAP of claim 12, wherein at least one of the responses further identifies an original aggregated packet size of the content, and wherein the number of segments is determined based at least in part on the aggregated packet size of the content.

14. The cNAP of claim 12, wherein the number of segments is selected so as to satisfy a predetermined latency constraint.

15. The cNAP of claim 12, wherein the instructions are further operative to select, from among the responding sNAPs, a selected subset of sNAPs from which to receive the content, wherein the number of segments is determined based at least in part on the selected subset.

16. The cNAP of claim 12, wherein the instructions are further operative to perform:

receiving the content as network-coded transmissions over the ICN;

decoding the network-coded transmissions to reconstruct the content; and providing the reconstructed content to the client.

17. The cNAP of claim 16, wherein the request for content is an HTTP request and the reconstructed content is provided to the client in an HTTP response.

18. The cNAP of claim 16, wherein the instructions are further operative, after reconstructing the content, to publish on the ICN a message indicating that the sNAPs can cease transmission of the content.

19. A server network attachment point (sNAP) for an information-centric network (ICN), the sNAP comprising a processor and a non-transitory computer-readable storage medium storing instructions operative to perform a method comprising:

receiving over the ICN a probe request identifying requested content;

retrieving the content from a server associated with the sNAP;

publishing on the ICN a response to the probe request, the response identifying a link capacity of the sNAP;

receiving over the ICN information indicating a selected number of segments;

encoding the content using network coding with the selected number of segments; and publishing at least a portion of the encoded content to the ICN.

20. The sNAP of claim 19, wherein the response to the probe request further identifies an aggregated packet size of the content.

* * * * *